United States Patent
Chung et al.

(10) Patent No.: US 12,484,258 B2
(45) Date of Patent: Nov. 25, 2025

(54) FLASH MEMORY CELL STRUCTURE HAVING SEPARATE PROGRAM AND ERASE ELECTRON PATHS

(71) Applicant: Allegro MicroSystems, LLC, Manchester, NH (US)

(72) Inventors: Thomas S. Chung, Kissimmee, FL (US); Maxim Klebanov, Palm Coast, FL (US); Sundar Chetlur, Frisco, TX (US); James McClay, Dudley, MA (US)

(73) Assignee: Allegro MicroSystems, LLC, Manchester, NH (US)

( * ) Notice: Subject to any disclaimer, the term of this patent is extended or adjusted under 35 U.S.C. 154(b) by 606 days.

(21) Appl. No.: 17/650,418

(22) Filed: Feb. 9, 2022

(65) Prior Publication Data

US 2023/0253507 A1    Aug. 10, 2023

(51) Int. Cl.
| | | |
|---|---|---|
| *G11C 16/14* | (2006.01) | |
| *G11C 16/10* | (2006.01) | |
| *H10D 30/01* | (2025.01) | |
| *H10D 30/68* | (2025.01) | |
| *H10D 62/13* | (2025.01) | |

(52) U.S. Cl.
CPC .......... *H10D 30/683* (2025.01); *G11C 16/10* (2013.01); *G11C 16/14* (2013.01); *H10D 30/0411* (2025.01); *H10D 62/151* (2025.01)

(58) Field of Classification Search
CPC ......... H01L 29/66825; H01L 29/42324; H01L 29/7883; H01L 29/7885; G11C 16/0425; G11C 16/0433; G11C 16/10; G11C 16/14
See application file for complete search history.

(56) References Cited

U.S. PATENT DOCUMENTS

| | | | |
|---|---|---|---|
| 5,341,342 A | 8/1994 | Brahmbhatt | |
| 6,127,225 A * | 10/2000 | Liu | G11C 16/0433 |
| | | | 438/257 |
| 6,212,103 B1 * | 4/2001 | Ahrens | G11C 16/26 |
| | | | 365/185.24 |
| 6,295,229 B1 * | 9/2001 | Chang | G11C 16/0433 |
| | | | 365/185.26 |

(Continued)

OTHER PUBLICATIONS

Pavan et al., "Flash Memory Cells—An Overview;" Proceedings of the IEEE, vol. 85, No. 8; Aug. 1997; 24 Pages.

(Continued)

*Primary Examiner* — Uyen Smet
(74) *Attorney, Agent, or Firm* — DALY, CROWLEY, MOFFORD & DURKEE, LLP (57) ABSTRACT

In one aspect, a flash memory cell includes a well having a first-type dopant, a source having a second-type dopant and formed within the well, a drain having the second-type dopant and formed within the well, a floating gate above the well, a control gate above the floating gate, an oxide compound disposed between the floating gate and the control gate, and a tunnel oxide disposed between the floating gate and the well. The flash memory cell is configured, in one of a program mode or an erase mode, to move an electron from the source to the floating gate. The flash memory cell is configured, in the other one of the program or the erase mode, to move an electron is from the floating gate to the drain.

29 Claims, 6 Drawing Sheets

(56) References Cited

U.S. PATENT DOCUMENTS

| | | | |
|---|---|---|---|
| 6,469,341 B1 * | 10/2002 | Sung | H10B 69/00 |
| | | | 438/266 |
| 6,963,102 B2 * | 11/2005 | Mori | H01L 29/7885 |
| | | | 257/E21.422 |
| 10,297,605 B2 | 5/2019 | Wang | |
| 2002/0048192 A1 | 4/2002 | Wang et al. | |
| 2006/0262605 A1 * | 11/2006 | Seki | G11C 16/12 |
| | | | 365/185.29 |
| 2012/0026793 A1 * | 2/2012 | Lukashevich | H10B 41/30 |
| | | | 257/E29.345 |
| 2012/0037984 A1 | 2/2012 | Yu | |
| 2015/0001639 A1 | 1/2015 | Fujie | |
| 2015/0255595 A1 | 9/2015 | Hebert et al. | |
| 2019/0259829 A1 | 8/2019 | Mun et al. | |
| 2021/0242193 A1 | 8/2021 | Klebanov et al. | |
| 2024/0120371 A1 | 4/2024 | McClay et al. | |

OTHER PUBLICATIONS

U.S. Non-Final Office Action dated Jun. 16, 2025 for U.S. Appl. No. 18/045,528; 20 Pages.

Response to Non-Final Office Action dated Jun. 16, 2025 for U.S. Appl. No. 18/045,528; Response Filed Sep. 12, 2025; 14 Pages.

* cited by examiner

FLASH MEMORY CELL STRUCTURE HAVING SEPARATE PROGRAM AND ERASE ELECTRON PATHS

BACKGROUND

Flash memory is an electronic non-volatile computer memory storage medium that can be electrically programmed, erased and reprogrammed. Flash memory stores information in an array of memory cells made from floating-gate transistors. In single-level cell devices, each cell stores one bit of information. Generally, a flash memory cell includes a control gate stacked above a floating gate. An electrically insulating tunnel oxide layer is located between the floating gate and a semiconductor (e.g., silicon). A source is located on one side of the floating gate in the semiconductor and a drain is located on the other side of the floating gate in the semiconductor. When using silicon as the semiconductor, generally the silicon below the floating gate is doped with a p-type dopant forming a p-type well.

In one example, traditional flash memory cells program using hot carrier injection and substrate tunnel erase with the source and the drain floating. In this example, a negative bias on the control gate and a positive voltage on the p-type is required for Fowler-Nordheim tunneling, which is a process of moving electrons from the control gate into the floating gate. In another example, a hot carrier injection is used to program, and a source tunnel current is used to erase. In a further example, the same portion of the tunnel oxide is used for both for program and erase.

SUMMARY

In one aspect, a flash memory cell includes a well having a first-type dopant, a source having a second-type dopant and formed within the well, a drain having the second-type dopant and formed within the well, a floating gate above the well, a control gate above the floating gate, an oxide compound disposed between the floating gate and the control gate, and a tunnel oxide disposed between the floating gate and the well. The flash memory cell is configured, in one of a program mode or an erase mode, to move an electron from the source to the floating gate. The flash memory cell is configured, in the other one of the program or the erase mode, to move an electron is from the floating gate to the drain.

In another aspect, a method includes constructing a flash memory cell that includes forming well having a first-type dopant, forming a source having a second-type dopant and formed within the well, forming a drain having the second-type dopant and formed within the well, forming a floating gate above the well, forming a control gate above the floating gate, forming an oxide compound between the floating gate and the control gate, and forming a tunnel oxide between the floating gate and the well. The flash memory cell is configured, in one of a program mode or an erase mode, to move an electron from the source to the floating gate. The flash memory cell is configured, in the other one of the program mode or the erase mode, to move an electron from the floating gate to the drain.

DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAIL DESCRIPTION

Described herein are techniques to fabricate a flash memory cell that has separate electron paths to program and to erase. Traditional flash memory cells use program and erase electron paths that stress a drain side tunnel oxide excessively by using the same electron path to program and to erase. However, the techniques described herein increase the reliability of the flash memory cell.

In particular, the flash memory cell described herein is asymmetric for a source and a drain and uses separate electron paths for a source tunnel area to program and a drain tunnel area to erase. A heavily doped tunnel implant is employed to define the source area and the drain area for the flash memory cell. The flash memory cell described herein shows an extended drain area compared to the source area. In a program mode, a control gate may be positively biased, and both the source and a p-type well are at zero volts. Electrons move from source to the floating gate. The p-type well area also contributes to the tunneling current for the program mode. The drain area is optimized to maximize efficiency of erase operations by asymmetric source drain structure.

By using separate electron paths to program and to erase with an optimized source and drain area, the flash memory cell described herein causes less stress on a tunnel oxide that can reduce an oxide trapping density. The flash memory cell described herein achieves a remarkably high endurance of about 160K to 170K cycles while traditional flash memory cells can only achieve about 1K cycles due to high stress on the tunnel oxide.

Figure 1:
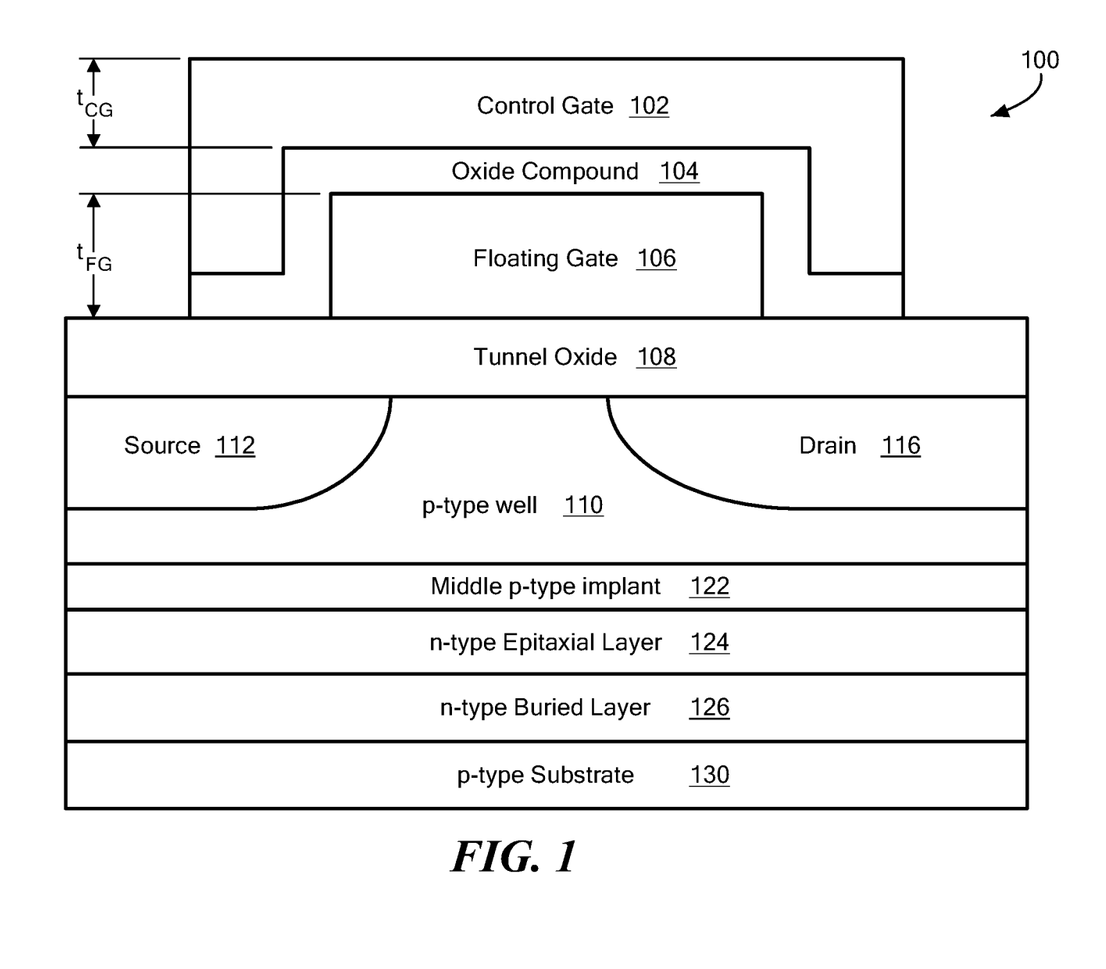
FIG. 1 is a cross-sectional diagram of an example of a flash memory cell having separate electron paths to program and to erase.

Referring to FIG. 1, an example of a flash memory cell having separate electron paths to program and to erase is a flash memory cell 100. The flash memory cell 100 may include a control gate 102 stacked above a floating gate 106 with an oxide compound 104 layer between the control gate 102 and the floating gate 106.

In one example, the thickness of the control gate 102, $t_{CG}$, is about 2,000 Angstroms±100 Angstroms. In one example, the thickness of the floating gate 106, $t_{FG}$, is about 3,000 Angstroms±100 Angstroms, which is about twice the thickness of floating gates of conventional memory cell structures.

In one example, the oxide compound may be an oxide-nitride-oxide (ONO) material. In one example, the ONO material may include 60 Angstroms of oxide deposited using low pressure chemical vapor deposition, 85 Angstroms of silicon nitride (Si3N4), and 35 Angstroms of thermally grown oxide.

The flash memory cell 100 may also include p-type substrate 130 and a n-type buried layer 126 within the p-type substrate 130. A n-type epitaxial layer 124 may be above the n-type buried layer 126, and a middle p-type implantation layer 122 may be above the n-type epitaxial layer 124.

A p-type well 110 may be formed above a middle p-type implantation layer 122. The p-type well 110 may include a source 112 and a drain 116. A tunnel oxide 108 separates the source 112, the p-type well 110 and the drain 116 from the control gate 102, the oxide compound 104 and the floating gate 106. In one example, the tunnel oxide thickness is 90 Angstroms.

In this configuration, the control gate 102 extends around at least three sides of the floating gate 106. The oxide compound 104 also extends around at least three sides of the floating gate 106 separating the floating gate 106 from the control gate 102.

In one example, the source 112 may be a heavily-doped n-type (n+) region, and the drain 116 may be heavily-doped n-type (n+) region. An area of the drain 116 is larger an area of the source 112. In one example, the area of drain 116 is optimized to improve flash cell memory performance. In one example, the source and drain tunneling area are optimized. In a further example, the program or erase pulse width for the flash cell is reduced as much as possible so that there is less accumulation of oxide traps within an optimized tunneling area.

In one example, a bias on the control gate 102 for programming and erasing may be varied from −9V to 16V. In one example, a maximum bias on the drain 116 for erasing may be limited to 5V to prevent drain to a substrate tunneling effect (GIDL—Gate Induced Drain Leakage).

Figure 2A:
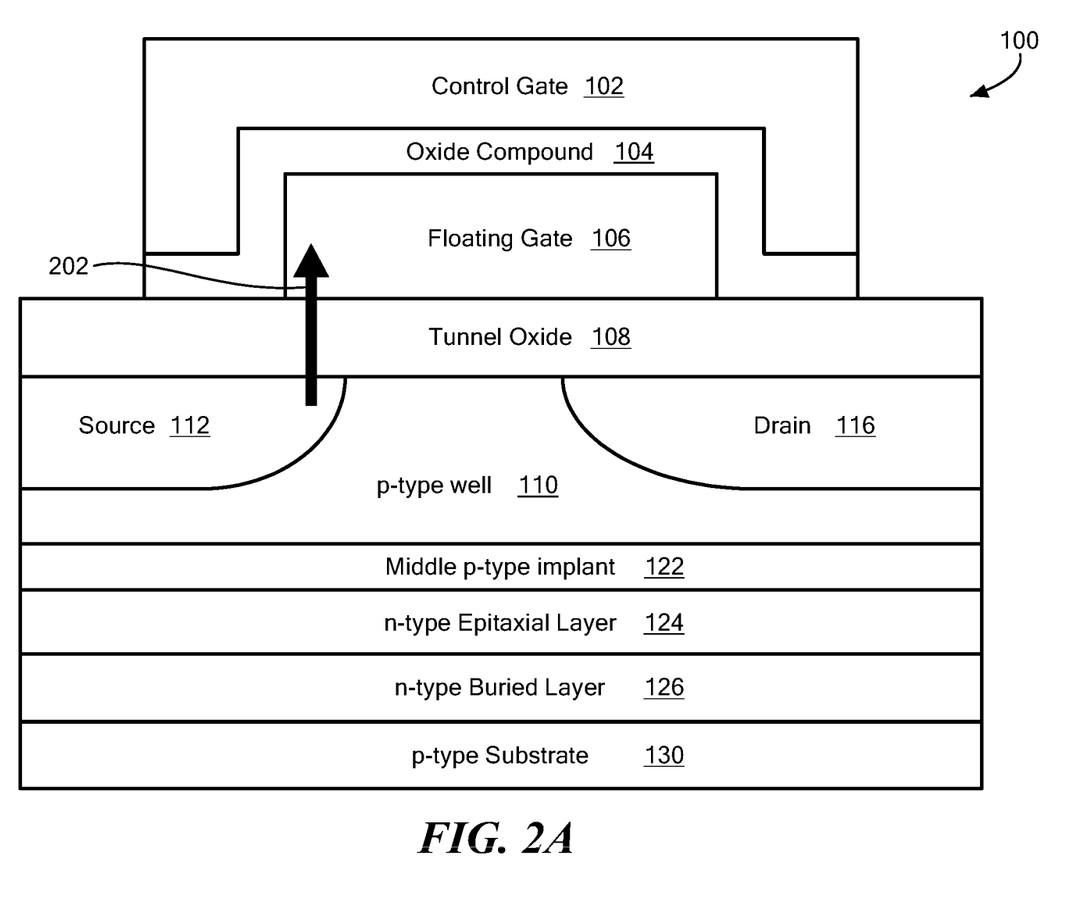
FIG. 2A is a cross-sectional diagram of an example of an electron path used to program using the flash memory cell of FIG. 1.

Referring to FIG. 2A, the flash memory cell 100 may be used to program by moving an electron from the source 112. For example, in a program mode, an electron path 202 is a path an electron takes from the source 112, through the tunnel oxide 108 to the floating gate 106.

In the program mode, the control gate 102 is positively biased, the p-well 110 and the source 112 are zero volts, and the drain 116 is floating. In one particular example, the control gate 102 is biased by 16V. A program post time, $t_{pp}$, or a time the flash memory cell 100 goes from a logical zero to a logical one is about 0.25 ms, which is significantly better than conventional flash memory cells that have a $t_{pp}$ of 0.50 ms.

Figure 2B:
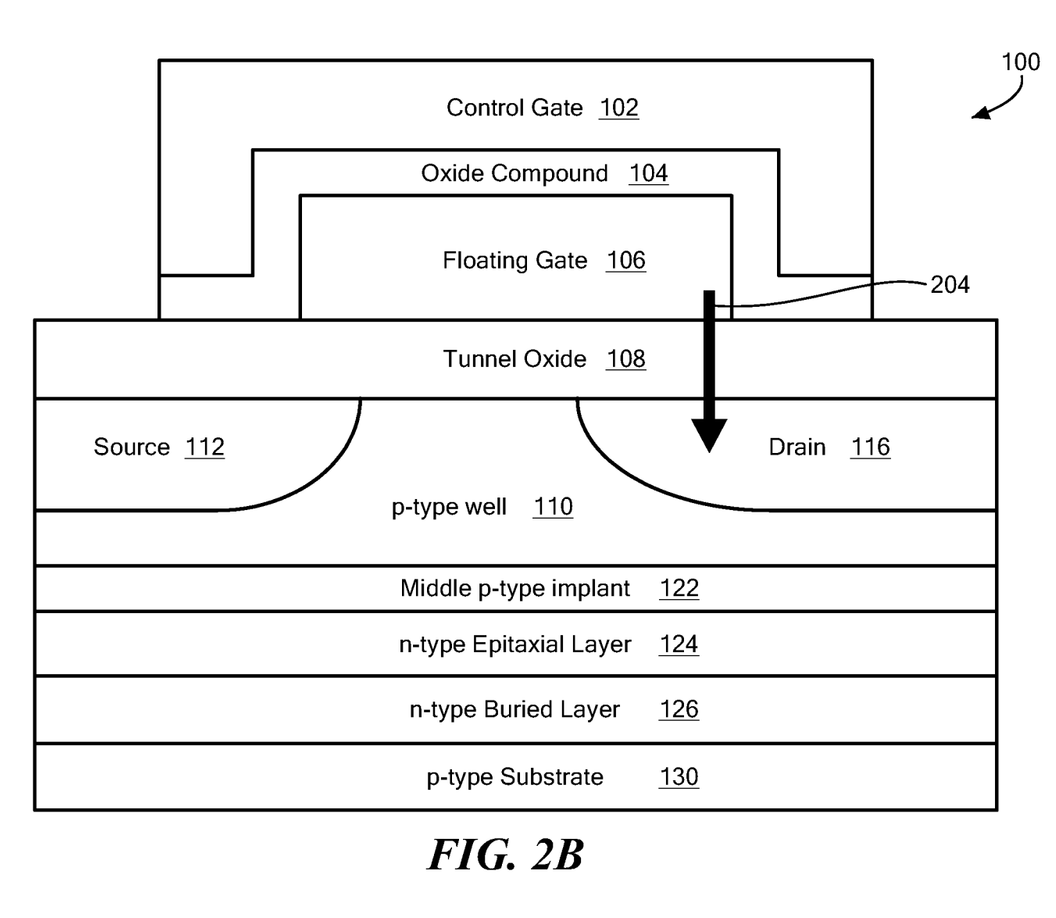
FIG. 2B is a cross-sectional diagram of an example of an electron path used to erase using the flash memory cell of FIG. 1.

Referring to FIG. 2B, the flash memory cell 100 may be used to erase by moving an electron from the floating gate 106. For example, in an erase mode, an electron path 204 is a path an electron takes from the floating gate 106, through the tunnel oxide 108 to the drain 116.

In the erase mode, the control gate 102 is negatively biased, the p-type well 110 and the source 112 are zero volts, and the drain 116 is positively biased. In one particular example, the control gate 102 is biased by −9V and/or the drain 116 is biased by 5V. A program post time, $t_{pp}$, or a time the flash memory cell 100 goes from a logical one to a logical zero is about 0.5 ms, which is significantly better than conventional flash memory cells that have a $t_{pp}$ of 2 ms.

Figure 3:
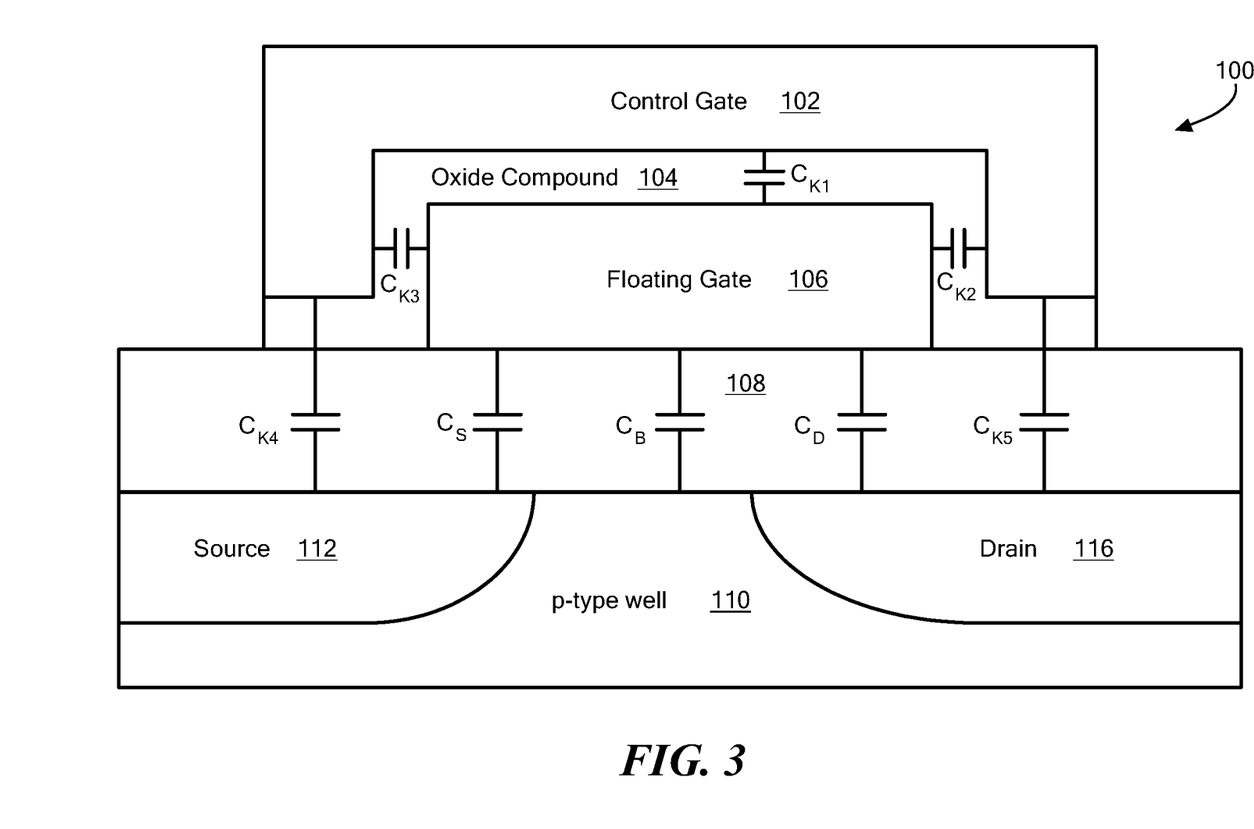
FIG. 3 is a cross-sectional diagram of an example of the capacitances in the flash memory cell of FIG. 1.

Referring to FIG. 3, the floating gate 106 is capacitively coupled to the control gate 102 such that the flash cell memory 100 has improved program and erase efficiency than conventional flash memory cells. The voltage of the floating gate $V_{FG}$ is about equal to the voltage of the control gate $V_{CG}$ times a control gate coupling ratio, k, where $k=C_K/C_T$, where $C_T=C_K+C_D+C_S+C_B$, where $C_B$ is a capacitance between the floating gate 106 and the p-type well 110, where $C_S$ is a capacitance between the floating gate 106 and the source 112, where $C_D$ is a capacitance between the floating gate 106 and the drain 116, where $C_K=C_{K1}+C_{K2}+C_{K3}+C_{K4}+C_{K5}$, where $C_{K1}$ is a capacitance between the control gate 102 and a top of the floating gate 106, where $C_{K2}$ is a capacitance between the control gate 102 and a first side of the floating gate 106, where $C_{K3}$ is a capacitance between the control gate 102 and a second side of the floating gate 106 opposite the first side of the floating gate 106, where $C_{K4}$ is a capacitance between the control gate 102 and the source 112, where $C_{K5}$ is a capacitance between the control gate 102 and the drain 116.

Figure 4:
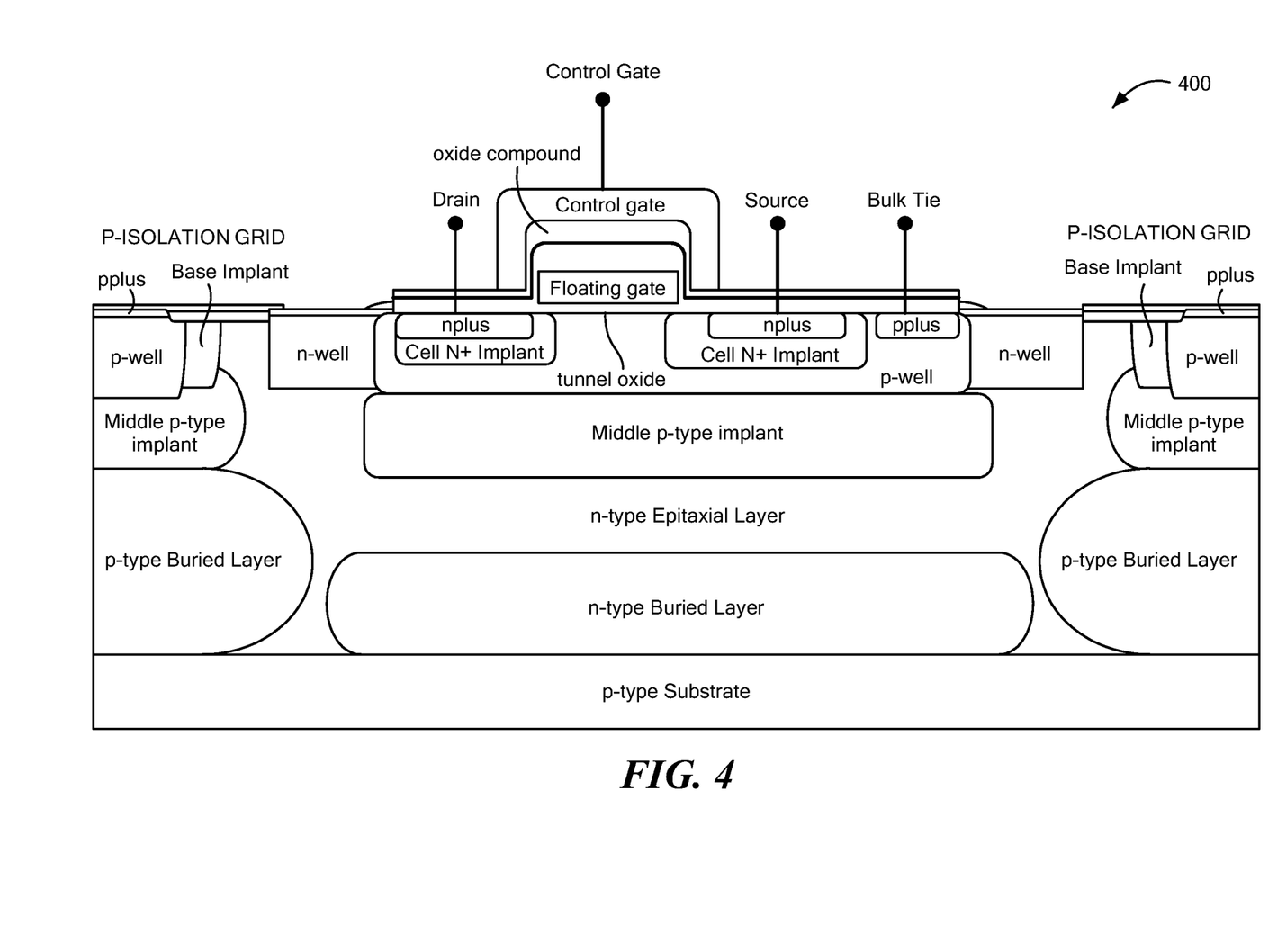
FIG. 4 is a cross-sectional diagram of another example of a flash memory cell having separate electron paths to program and to erase.

Referring to FIG. 4, another example of the flash memory cell 100 is a flash memory cell 400. The flash memory cell 400 is a one-transistor (1T) flash memory cell.

Figure 5:
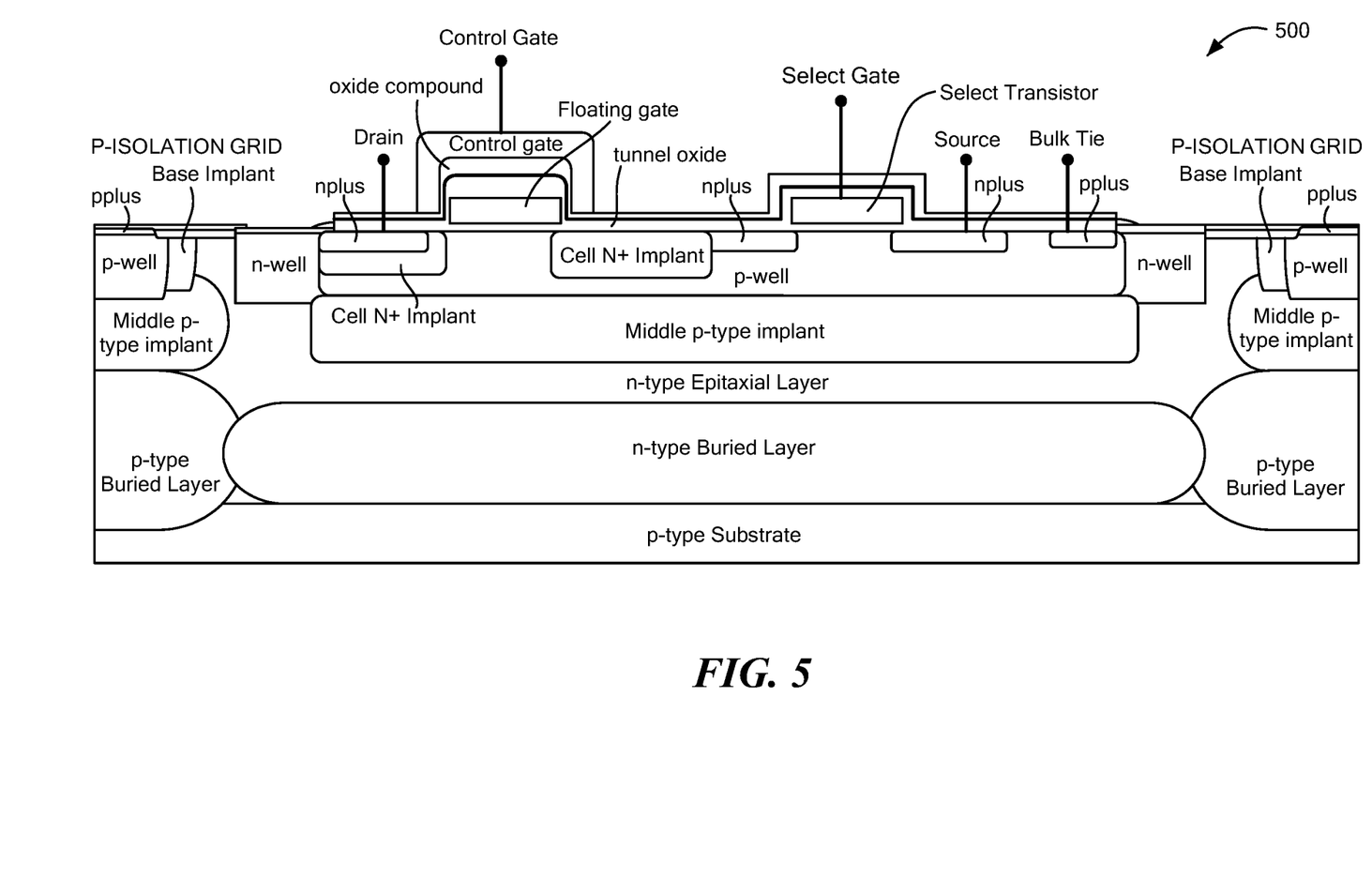
FIG. 5 is a cross-sectional diagram of a further example of a flash memory cell having separate electron paths to program and to erase.

Referring to FIG. 5, a further example of the flash memory cell 100 is a flash memory cell 500. The flash memory cell 500 is a two-transistor (2T) flash memory cell.

The program and erase mode conventions described herein are conventions used in the United States. Other countries use conventions that are opposite than the United States. For example, those countries that use conventions that are opposite than the United States using the techniques taught herein would, in a program mode, move an electron from the floating gate to the drain, and, in an erase mode, move an electron from the source to the floating gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A flash memory cell comprising:

a well having a first-type dopant;

a source having a second-type dopant and formed within the well;

a drain having the second-type dopant and formed within the well;

a floating gate above the well, wherein the floating gate has a first edge overlapping with the source and a second edge overlapping with the drain;

a control gate above the floating gate;

an oxide compound disposed between the floating gate and the control gate;

a tunnel oxide disposed between the floating gate and the well, wherein the flash memory cell is configured, in one of a program mode or an erase mode, to move an electron from the source to the floating gate, wherein the flash memory cell is configured, in the other one of the program or the erase mode, to move an electron from the floating gate to the drain, and wherein the control gate extends around at least three sides of the floating gate, and wherein the oxide compound extends around at least three sides of the floating gate; and a first layer disposed on an opposite side of the well as the floating gate, the first layer having a second-type dopant to form a first p-n junction with the well to provide a diode.

2. The flash memory cell of claim 1, wherein an area of the drain is larger than an area of the source.

3. The flash memory cell of claim 1, wherein the flash memory cell is a one-transistor (1T) flash memory cell.

4. The flash memory cell of claim 1, wherein the flash memory cell is a two-transistor (2T) flash memory cell.

5. The flash memory cell of claim 1, wherein the oxide compound is an oxide-nitride-oxide (ONO) material.

6. The flash memory cell of claim 1, wherein the first-type dopant is a p-type dopant, and
wherein the second-type dopant is an n-type dopant.

7. The flash memory cell of claim 1, wherein the tunnel oxide is between the control gate and the source.

8. The flash memory cell of claim 7, wherein the tunnel oxide is between the control gate and the drain.

9. The flash memory cell of claim 1, wherein the tunnel oxide is between the control gate and the drain.

10. The flash memory cell of claim 1, wherein, in the one of the program mode or the erase mode, the control gate is positively biased, and the well and the source are zero volts.

11. The flash memory cell of claim 1, wherein, in the one of the program mode or the erase mode, the drain is floating.

12. The flash memory cell of claim 11, wherein, in the other one of the program mode or the erase mode, the control gate is negatively biased, the well and the source are zero volts, and the drain is positively biased.

13. A method comprising:
constructing a flash memory cell comprising:
forming well having a first-type dopant;
forming a source having a second-type dopant and formed within the well;
forming a drain having the second-type dopant and formed within the well;
forming a floating gate above the well;
forming a control gate above the floating gate;
forming an oxide compound between the floating gate and the control gate; and
forming a tunnel oxide between the floating gate and the well,
wherein the flash memory cell is configured, in one of a program mode or an erase mode, to move an electron from the source to the floating gate,
wherein the flash memory cell is configured, in the other one of the program mode or the erase mode, to move an electron from the floating gate to the drain, and
wherein the control gate extends around at least three sides of the floating gate, and wherein the oxide compound extends around at least three sides of the floating gate; and forming a first layer disposed on an opposite side of the well as the floating gate, the first layer having a second-type dopant to form a first p-n junction with the well to provide a diode.

14. The method of claim 13, wherein forming the source having a second-type dopant and formed within the well and forming the drain having the second-type dopant and formed within the well comprises forming an area of the drain that is larger than an area of the source.

15. The method of claim 13, wherein constructing the flash memory cell comprises constructing a one-transistor (1T) flash memory cell.

16. The method of claim 13, wherein constructing the flash memory cell comprises constructing a two-transistor (2T) flash memory cell.

17. The method of claim 13, wherein forming the oxide compound comprises forming an oxide-nitride-oxide (ONO) material.

18. The method of claim 13, wherein the first-type dopant is a p-type dopant, and
wherein the second-type dopant is an n-type dopant.

19. The method of claim 13, further comprising forming the tunnel oxide between the control gate and the source.

20. The method of claim 19, further comprising forming the tunnel oxide between the control gate and the drain.

21. The method of claim 13, further comprising forming the tunnel oxide between the control gate and the drain.

22. The method of claim 13, wherein, in the one of the program mode or the erase mode, moving an electron from the source to the floating gate comprises:
positively biasing the control gate; and
applying zero volts to the well and the source.

23. The method of claim 22, wherein, in the one of the program mode or the erase mode, moving an electron from the source to the floating gate, further comprises floating the drain.

24. The method of claim 23, wherein, in the other one of the program mode or the erase mode, moving an electron from the floating gate to the drain comprises:
negatively biasing the control gate;
applying zero volts to the well and the source; and
positively biasing the drain.

25. The flash memory cell of claim 1, wherein the source and the drain are asymmetric and are configured to provide separate electron paths for a source tunnel area to program and a drain tunnel area to erase.

26. The flash memory cell of claim 1, wherein the first-type dopant is p-type, the second-type dopant is n-type, and the first layer comprises an n-type epitaxial layer.

27. The flash memory cell of claim 1, wherein the first-type dopant is p-type, the second-type dopant is n-type, and the first layer comprises an epitaxial layer and a middle p-type implant.

28. The flash memory cell of claim 27, further including a second layer abutting the first layer, the second layer having an n-type dopant, wherein the second layer is a buried layer.

29. The flash memory cell of claim 28, further including a p-type substrate forming a second p-n junction.

* * * * *